(12) United States Patent
Schultz et al.

(10) Patent No.: US 11,256,100 B2
(45) Date of Patent: Feb. 22, 2022

(54) HEAD-MOUNTED DISPLAY WITH PIVOTING IMAGING LIGHT GUIDE

(71) Applicant: Vuzix Corporation, West Henrietta, NY (US)

(72) Inventors: Robert J. Schultz, Victor, NY (US); Paul J. Travers, Honeoye Falls, NY (US); Tyler W. Porter, Honeoye Falls, NY (US)

(73) Assignee: Vuzix Corporation, West Henrietta, NY (US)

(*) Notice: Subject to any disclaimer, the term of this patent is extended or adjusted under 35 U.S.C. 154(b) by 476 days.

(21) Appl. No.: 16/068,068

(22) PCT Filed: Jan. 5, 2017

(86) PCT No.: PCT/US2017/012348
§ 371 (c)(1),
(2) Date: Jul. 3, 2018

(87) PCT Pub. No.: WO2017/120346
PCT Pub. Date: Jul. 13, 2017

(65) Prior Publication Data
US 2020/0278554 A1 Sep. 3, 2020

Related U.S. Application Data

(60) Provisional application No. 62/275,560, filed on Jan. 6, 2016.

(51) Int. Cl.
*G02B 27/01* (2006.01)
*F21V 8/00* (2006.01)

(52) U.S. Cl.
CPC ....... *G02B 27/0176* (2013.01); *G02B 6/0031* (2013.01); *G02B 6/0055* (2013.01);
(Continued)

(58) Field of Classification Search
None
See application file for complete search history.

(56) References Cited

U.S. PATENT DOCUMENTS

| 4,848,891 A | 7/1989 | Lee |
| 5,003,300 A | 3/1991 | Wells |

(Continued)

FOREIGN PATENT DOCUMENTS

| JP | 2001522064 A | 11/2001 |
| JP | 2003536102 A | 12/2003 |

(Continued)

OTHER PUBLICATIONS

International Search Report for International Application No. PCT/US2017/012348 dated Mar. 23, 2017.
(Continued)

*Primary Examiner* — Christopher Stanford
*Assistant Examiner* — Journey F Sumlar
(74) *Attorney, Agent, or Firm* — Jacob D. Merrill, Esq.; Thomas B. Ryan, Patent Agent

(57) ABSTRACT

A frame supports a display apparatus against the head of a viewer. A projector fitted within the frame generates a beam of image-bearing light. A light guide coupled to a forward section of the frame has a waveguide, an in-coupling diffractive optic formed on the waveguide for directing image-bearing light beams into the waveguide, a turning optic formed on the waveguide for expanding the respective image-bearing light beams from the in-coupling diffractive optic in a first dimension, and an out-coupling diffractive optic formed on the waveguide for expanding the respective
(Continued)

image-bearing light beams in a second dimension orthogonal to the first dimension and forming a virtual image within a viewer eyebox. A mount supports the light guide in front of the viewer and provides a hinge for angular adjustment of the waveguide with respect to the projector.

18 Claims, 10 Drawing Sheets

(52) U.S. Cl.
CPC ....... *G02B 6/0086* (2013.01); *G02B 27/0172* (2013.01); *G02B 2027/0159* (2013.01)

(56) References Cited

U.S. PATENT DOCUMENTS

| | | | |
|---|---|---|---|
| 5,666,181 | A | 9/1997 | Conway |
| 6,680,802 | B1* | 1/2004 | Ichikawa ........... G02B 27/0172 359/630 |
| 2006/0238878 | A1 | 10/2006 | Miyake et al. |
| 2010/0046070 | A1 | 2/2010 | Mukawa |
| 2011/0012814 | A1 | 1/2011 | Tanaka |
| 2011/0096401 | A1 | 4/2011 | Levola |
| 2012/0032874 | A1 | 2/2012 | Mukawa |
| 2012/0062998 | A1 | 3/2012 | Schultz et al. |
| 2013/0051730 | A1 | 2/2013 | Travers et al. |
| 2014/0300966 | A1* | 10/2014 | Travers ................ G03H 1/2205 359/558 |
| 2014/0340286 | A1 | 11/2014 | Machida et al. |
| 2015/0138714 | A1 | 5/2015 | Davis |
| 2015/0309263 | A2 | 10/2015 | Abovitz et al. |

FOREIGN PATENT DOCUMENTS

| | | |
|---|---|---|
| JP | 4023412 B2 | 12/2007 |
| JP | 2008022358 A | 1/2008 |
| JP | 2012037761 A | 2/2012 |
| WO | 9923525 | 5/1999 |
| WO | 0195027 A2 | 12/2001 |
| WO | 2013111471 A1 | 1/2013 |
| WO | 2016112130 A1 | 7/2016 |

OTHER PUBLICATIONS

International Written Opinion for International Application No. PCT/US2017/012348 dated Mar. 23, 2017.
International Search Report for International Application No. PCT/US2017/012356 dated Mar. 16, 2017.
International Written Opinion for International Application No. PCT/US2017/012356 dated Mar. 16, 2017.
Dewen Cheng et al., "Design of an ultra-thin near-eye display with geometrical waveguide and freeform optics", Optics Express, vol. 22, No. 17, Aug. 19, 2014, p. 20705, XP055541300.
Extended European Search report in connection with application No. 17736343.9 dated Jun. 7, 2019.
Japanese Office Action in connection with application No. 2018-532193 dated Jun. 11, 2019.

* cited by examiner

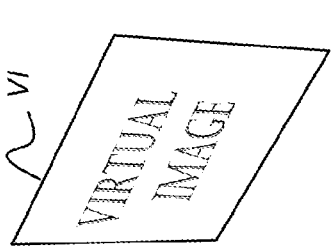
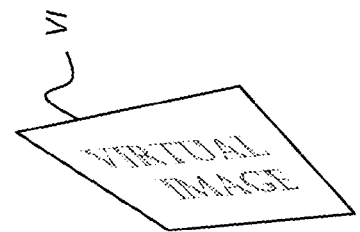
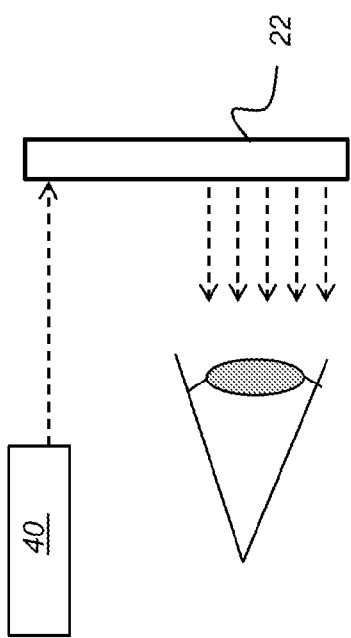
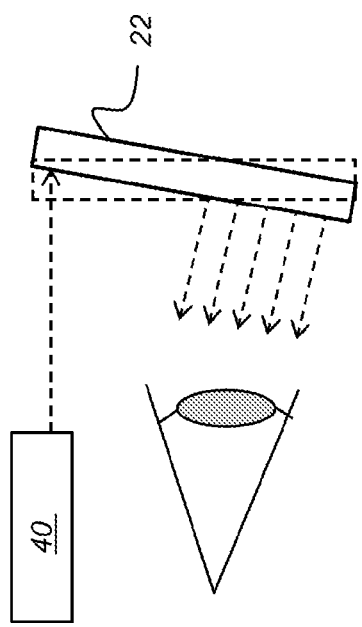
FIG. 6A
FIG. 6B

HEAD-MOUNTED DISPLAY WITH PIVOTING IMAGING LIGHT GUIDE

TECHNICAL FIELD

This invention generally relates to electronic displays and more particularly relates to head-mounted (near-eye) displays that use imaging light guides to convey image-bearing light to a viewer.

BACKGROUND OF THE INVENTION

Head-Mounted Displays (HMDs), which include monocular and binocular near eye displays, are being developed for a range of diverse uses, including military, commercial, industrial, fire-fighting, and entertainment applications. For many of these applications, there is particular value in forming a virtual image that can be visually superimposed over the real-world image that lies in the field of view of the HMD user. Imaging light guides incorporating various types of waveguides relay image-bearing light to a viewer in a narrow space for directing the virtual image to the viewer's pupil and enabling this superposition function.

In the conventional imaging light guide, collimated angularly related light beams from an image source are coupled into the light guide substrate, generally referred to as a waveguide, by an input optical coupling such as an in-coupling diffraction grating, which can be formed on a surface of the substrate or buried within the substrate. Other types of diffractive optics could be used as input couplings, including diffractive structures formed of alternating materials of variable index such as holographic polymer dispersed liquid crystal (HPDLC) or volume holograms. The diffractive optics could also be formed as surface relief diffraction gratings. The collimated light beams can be directed out of the waveguide by a similar output optical coupling, which can also take the form of a diffractive optic. The collimated angularly related beams ejected from the waveguide overlap at an eye relief distance from the waveguide forming an exit pupil within which a virtual image generated by the image source can be viewed. The area of the exit pupil through which the virtual image can be viewed at the eye relief distance is referred to as an "eyebox."

The output coupling can also be arranged for enlarging the exit pupil. For example, the collimated beams can be enlarged in one dimension by offsetting partially reflected portions of the collimated beams in a direction at which the collimated beams propagate along the output coupling or by ejecting collimated beams of different angles from different positions along the waveguide to more efficiently overlap the collimated beams at the eye relief distance from the waveguide.

A so-called "turning optic" located along the waveguide between the input coupling and the output coupling, can be used for expanding pupil size in a second dimension. The expansion can be effected by offsetting reflected portions of the collimated beam to enlarge a second dimension of the beams themselves or by directing the collimated beams to different areas of the output coupling so the collimated beams of different angles are ejected from different positions to more efficiently overlap within the eyebox. The turning optic can also take the form of a diffractive optic and, especially when located between the diffraction gratings of the input coupling and output coupling, can also be referred to as an intermediate grating.

The imaging light guide optics form a virtual image that has the appearance of a real object that is positioned a distance away and within the field of view of the observer. As is well known to those skilled in the imaging arts, the virtual image is synthetically simulated by divergence of light rays provided to the eye from an optical system. This optical effect forms a "virtual image" that is made to appear as if at a given position and distance in the field of view of the observer; there is no corresponding "real" object in the field of view from which the rays actually diverge. So-called "augmented reality" viewing systems typically employ a virtual imaging system to provide superposition of the virtual image onto the real-world scene that is viewed. This capability for forming a virtual image that can be combined with real-world image content in the viewer's field of view distinguishes augmented reality imaging devices from other virtual image devices that do not allow simultaneous view of the real world.

Successfully forming a virtual image at an intended position for a viewer requires that the optical apparatus satisfy various geometrical and positional requirements. These requirements often constrain design and usability factors such as viewer position and placement of the optical system relative to the eye of the viewer. The optical system, for example, may not be able to position the virtual image at precisely the position in which it would be most useful for a particular viewer or purpose due to anatomical variations between viewers. The viewer may want to have the virtual image content available within the field of view, but may not want image content directly superimposed onto, and partially obscuring, real-world objects in the field of view. Rigid constraints resulting from a number of previous HMD optics designs can make an augmented reality system awkward to use for practical functions.

Thus, it can be appreciated that there would be practical utility in methods and apparatus that provided some measure of flexibility in placement of optical components used for virtual imaging as well as for relative placement of the virtual image itself.

SUMMARY OF THE INVENTION

It is an object of the present disclosure to advance the art of image presentation within compact head-mounted (near-eye) displays. Advantageously, embodiments of the present disclosure provide a wearable display with an imaging light guide that offers an enlarged pupil size for presenting high resolution wide field of view (FOV) content to the viewer. In addition, embodiments of the present disclosure also allow the viewer to manually adjust the relative position of the virtual image content without removing the wearable display and without interrupting visibility of the virtual content display.

These and other aspects, objects, features and advantages of the present invention will be more clearly understood and appreciated from a review of the following detailed description of the preferred embodiments and appended claims, and by reference to the accompanying drawings.

According to an aspect of the present disclosure, there is provided a wearable display apparatus including a frame that supports the display apparatus against a viewer's head. A projector fitted within the frame generates angularly related beams of image-bearing light projected along a path. An imaging light guide is coupled to a forward section of the frame in the path of the image-bearing light beams. The imaging light guide includes (a) a waveguide having a substrate formed from a transparent optical material, (b) an in-coupling diffractive optic formed on the waveguide and disposed to direct the image-bearing light beams into the waveguide, (c) a turning optic formed on the waveguide and disposed to expand the respective image-bearing light beams from the in-coupling diffractive optic in a first dimension and to direct the expanded image-bearing light beams toward an out-coupling diffractive optic. The out-coupling diffractive optic is also formed on the waveguide and disposed to expand the respective image-bearing light beams in a second dimension and to form a virtual image within a viewer eyebox. A mount supports the imaging light guide in front of the viewer and provides a vertical hinge for horizontal angular adjustment of the waveguide with respect to the projector.

BRIEF DESCRIPTION OF THE DRAWING FIGURES

While the specification concludes with claims particularly pointing out and distinctly claiming the subject matter of the present invention, it is believed that the invention will be better understood from the following description when taken in conjunction with the accompanying drawings.

FIG. 6A is a side view schematic that shows how an imaging light guide forms a virtual image with the projector at a normal angle of incidence.

FIG. 6B is a side view schematic that shows how an imaging light guide forms a virtual image with the projected light at an oblique angle of incidence.

DETAILED DESCRIPTION OF THE INVENTION

Figure 1:
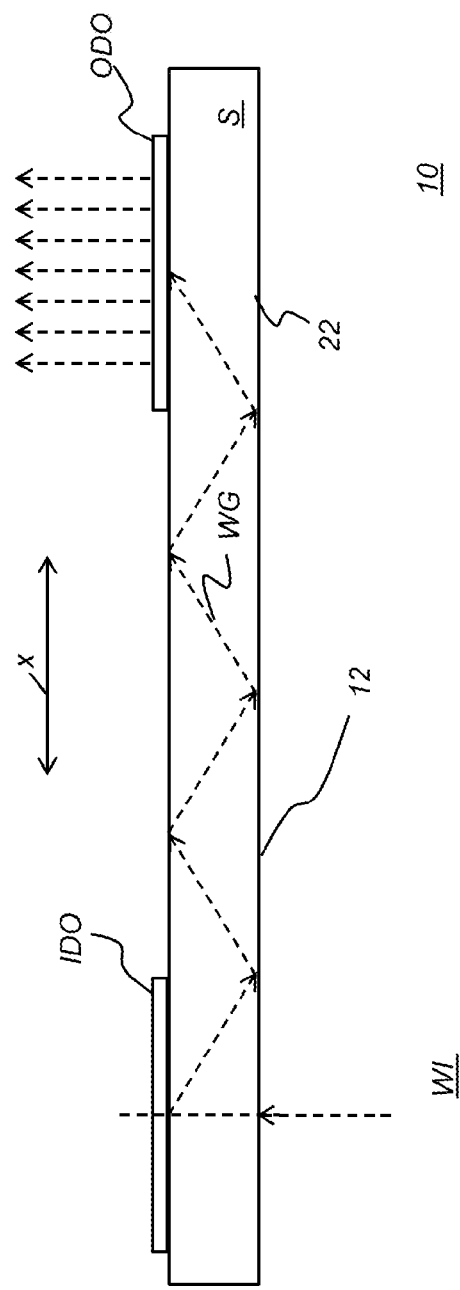
FIG. 1 is a schematic diagram showing a simplified cross-sectional view of one possible configuration of a monocular type imaging light guide arranged as a diffractive beam expander.

The present description is directed in particular to elements forming part of, or cooperating more directly with, apparatus in accordance with the invention. It is to be understood that elements not specifically shown or described may take various forms well known to those skilled in the art.

Where they are used herein, the terms "first", "second", and so on, do not necessarily denote any ordinal, sequential, or priority relation, but are simply used to more clearly distinguish one element or set of elements from another, unless specified otherwise. The terms "top" and "bottom" do not necessarily designate spatial position but provide relative information about a structure, such as to distinguish opposing surfaces of a planar (flat) waveguide.

In the context of the present disclosure, the terms "viewer", "operator", "observer", and "user" are considered to be equivalent and refer to the person who wears the HMD viewing device.

As used herein, the term "energizable" relates to a device or set of components that perform an indicated function upon receiving power and, optionally, upon receiving an enabling signal.

The term "actuable" has its conventional meaning, relating to a device or component that is capable of effecting an action in response to a stimulus, such as in response to an electrical signal, for example.

The term "set", as used herein, refers to a non-empty set, as the concept of a collection of elements or members of a set is widely understood in elementary mathematics. The term "subset", unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S.

In the context of the present disclosure, the term "oblique" means at an angle that is not an integer multiple of 90 degrees. Two lines, linear structures, or planes, for example, are considered to be oblique with respect to each other if they diverge from or converge toward each other at an angle that is at least about 5 degrees or more away from parallel, or at least about 5 degrees or more away from orthogonal.

In the context of the present disclosure, the terms "wavelength band" and "wavelength range" are equivalent and have their standard connotation as used by those skilled in the art of color imaging and refer to a range of light wavelengths that are used to form one or more colors in polychromatic images. Different wavelength bands are directed through different color channels, such as to provide red, green, and blue primary colors in conventional color imaging applications.

As an alternative to real image projection, an optical system can produce a virtual image display. In contrast to methods for forming a real image, a virtual image is not formed on a display surface. That is, if a display surface were positioned at the perceived location of a virtual image, no image would be formed on that surface. A virtual image display has a number of inherent advantages for an augmented reality display. For example, the apparent size of a virtual image is not limited by the size or location of a display surface. Additionally, the source object for a virtual image may be small; a magnifying glass, as a simple example, provides a virtual image of its object. In comparison with systems that project a real image, a more realistic viewing experience can be provided by forming a virtual image that appears to be some distance away. Providing a virtual image also obviates any need to compensate for screen artifacts, as may be necessary when projecting a real image.

In the context of the present disclosure, the term "coupled" is intended to indicate a physical association, connection, relation, or linking, between two or more components, such that the disposition of one component affects the spatial disposition of a component to which it is coupled. For mechanical coupling, two components need not be in direct contact, but can be linked through one or more intermediary components. A component for optical coupling allows light energy to be input to, or output from, an optical apparatus. The terms "beam expander" and "pupil expander" are considered to be synonymous, used interchangeably herein.

FIG. 1 is a schematic diagram that shows a simplified cross-sectional view of one conventional configuration of a light guide 10 arranged as a monocular type light diffractive beam expander or exit pupil expander comprising an input coupling optic such as an in-coupling diffractive optic IDO, and an output coupling optic, such as an out-coupling diffractive optic ODO arranged on a transparent and planar waveguide 22 having a substrate S. In this example, in-coupling diffractive optic IDO is shown as a reflective type diffraction grating; however, in-coupling diffractive optic IDO could alternately be a transmissive diffraction grating, volume hologram or other holographic diffraction element, or other type of optical component that provides diffraction for the incoming, image-bearing light, arranged on a lower surface 12 of the waveguide substrate S, where the incoming light wave WI first interacts with the waveguide substrate S.

When used as a part of a virtual display system, in-coupling diffractive optic IDO couples each of a plurality of angularly related in-coming image-bearing light beams WI from an imager, via suitable front end optics (not shown), into the substrate S the waveguide 22. The input light beams WI are diffracted by in-coupling diffractive optic IDO. For example, first order diffracted light propagates as an angularly related set of beams WG along the substrate S, moving toward the right in the FIG. 1 system, toward out-coupling diffractive optic ODO. Between gratings or other types of diffractive optics, light is channeled or directed along the waveguide 22 by Total Internal Reflection (TIR). Out-coupling diffractive optic ODO contributes to beam expansion via multiple diffractive encounters with the propagating light beams WG along its length, i.e., along the x-axis in the view of FIG. 1, and directs the diffracted light from each encounter outwards towards the intended location of an observer's eye.

Figure 2:
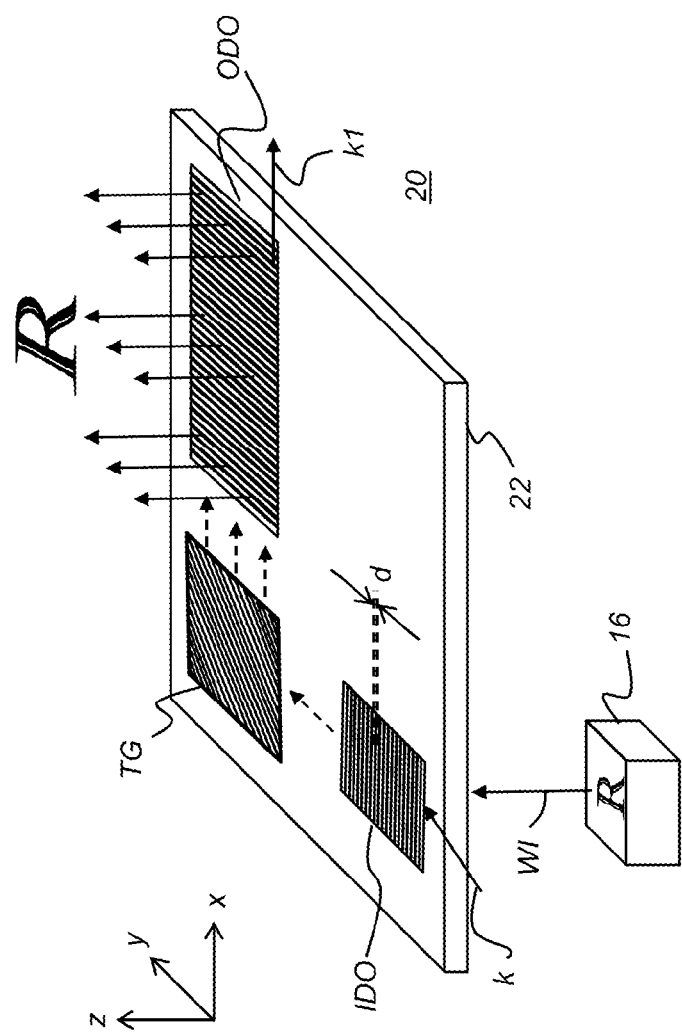
FIG. 2 is a perspective view showing an imaging light guide arranged as a diffractive beam expander with a turning grating.

The perspective view of FIG. 2 shows an imaging light guide 20 arranged as a known beam expander that provides beam expansion along x- and y-axes using an intermediate turning grating TG to redirect the light output (first diffracted mode) from in-coupling diffractive optic IDO to out-coupling diffractive optic ODO. In the FIG. 2 device, in-coupling diffractive optic IDO containing periodic rulings with a period d diffracts angularly related incoming input optical beams WI into the waveguide 22 as a set of angularly related beams WG, propagating by total internal reflection in an initial direction towards the intermediate turning grating TG. Intermediate grating TG is termed a "turning grating" because of its function in the optical path, redirecting the beams WG from within the waveguide 22 according to its grating vector in a direction towards the out-coupling diffractive optic ODO, thereby accounting for a difference in angle between the grating vectors of the in-coupling diffraction optic IDO and the out-coupling diffraction optic ODO. Intermediate grating TG, which has angular orientation of diffraction elements and a spacing geometry determined by spacing period d, not only redirects the internally reflected beams WG but also contributes to beam expansion via multiple diffractive encounters with the light beams WG along the initial direction of propagation, i.e., along the y-axis in the view of FIG. 2. The out-coupling diffractive optic ODO contributes to an orthogonal beam expansion via multiple diffractive encounters with the light beams WG along the redirected direction of propagation, i.e., along the x-axis in the view of FIG. 2.

The grating vectors, generally designated k and shown with subscripts where they are specific to light within a color channel, extend parallel to the plane of the waveguide surface and are in the direction of the periodicity of the in-coupling and out-coupling diffractive optics IDO and ODO, respectively.

In considering a light guide design used for imaging it should be noted that image-bearing light traveling within a waveguide is effectively encoded by the in-coupling optics, whether the in-coupling mechanism uses gratings, holograms, prisms, mirrors, or some other mechanism. Any reflection, refraction, and/or diffraction of light that takes place at the input must be correspondingly decoded by the output in order to re-form the virtual image that is presented to the viewer.

A turning grating TG, placed at an intermediate position between the input and output couplings, such as the in-coupling and out-coupling diffractive optics IDO and ODO, is typically chosen to minimize any changes on the encoded light. As such, the pitch of the turning grating preferably matches the pitch of the in-coupling and out-coupling diffractive optics IDO and ODO. In addition, the virtual image can be preserved by orienting the turning grating at around 60 degrees to in-coupling and out-coupling diffractive optics IDO and ODO in such a way that the encoded ray bundles are turned ODO degrees by one of the 1st reflection orders of the turning grating TG. The diffractive effects of the turning grating TG are most pronounced on the vector component of the incoming rays that are parallel to the grating vector of the turning grating. Turning gratings so arranged redirect ray bundles within the guide substrate while minimizing any changes to the encoded angular information of the virtual image. The resultant virtual image in such a designed system is not rotated. If such a system did introduce any rotation to the virtual image, the rotational effects could be non-uniformly distributed across different field angles and wavelengths of light, thus causing unwanted distortions or chromatic aberrations in the resultant virtual image.

The use of turning grating TG as envisioned for certain embodiments described herein preserves an inherent geometrical accuracy to the design of the light guide 20 so that the input beam and output beam are symmetrically oriented with respect to each other. With proper grating TG spacing and orientation, grating vectors k direct the light from the in-coupling diffractive optic IDO to the out-coupling diffractive optic ODO. It should be noted that the image that is formed for the imaging light guide viewer is a virtual image, focused at infinity or at least well in front of the light guide 20, but with the relative orientation of output image content to input image content preserved. A change in the rotation about the z axis or angular orientation of incoming light beams WI with respect to the x-y plane can cause a corresponding symmetric change in rotation or angular orientation of outgoing light from out-coupling diffractive optic ODO. From the aspect of image orientation, turning grating TG is intended to function as a type of optical relay, providing expansion along one axis of the image that is input through the in-coupling diffractive optic IDO and redirected to out-coupling diffractive optic ODO. Turning grating TG is typically a slanted or square grating or, alternatively, can be a blazed grating. Reflective surfaces can alternately be used for turning the light toward the out-coupling diffractive optic ODO.

Beam expansion in two different dimensions is provided when using the arrangement of FIG. 2. Turning grating TG expands the diffracted beam from in-coupling diffractive optic IDO in the y direction as shown. Out-coupling diffractive optic ODO further expands the diffracted beam in the x direction, orthogonal to the y direction as shown.

The known imaging light guide 20 that is shown in FIG. 2 has been used in a number of existing head-mounted device (HMD) designs for providing image content to a viewer. This type of beam expander is particularly well-suited to augmented reality applications in which image content can be superimposed on a real-world view as seen through the transparent imaging light guide.

Figure 3B:
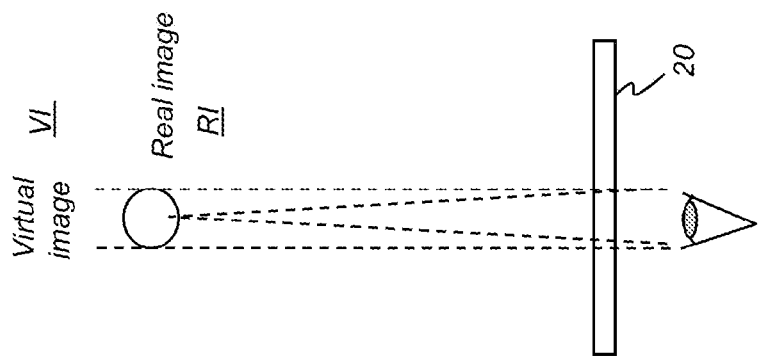
FIG. 3B is a cross-sectional schematic view showing viewer focus for a real object in the field of view.
Figure 3A:
FIG. 3A is a cross-sectional schematic view showing how the light that forms the virtual image is provided as collimated light beams to the eye.

Augmented Reality (AR) applications combine virtual image and real-world image content from the field of view (FOV) and often superimpose virtual image content onto the FOV. The generated virtual image is formed by the optical system. In the case of imaging light guide 20 (FIG. 2), light that forms the virtual image is provided as collimated light to the eye, as shown in the cross-sectional schematic view of FIG. 3A. The eye accepts this light as if focusing on an object that is at a considerable distance away. For a field of view (FOV) with objects farther than about 5 meters (5 m), as shown in FIG. 3B, the focus condition of the normal eye is generally close enough to infinity focus so that focus disparity is not readily perceptible to the viewer.

Figure 4A:
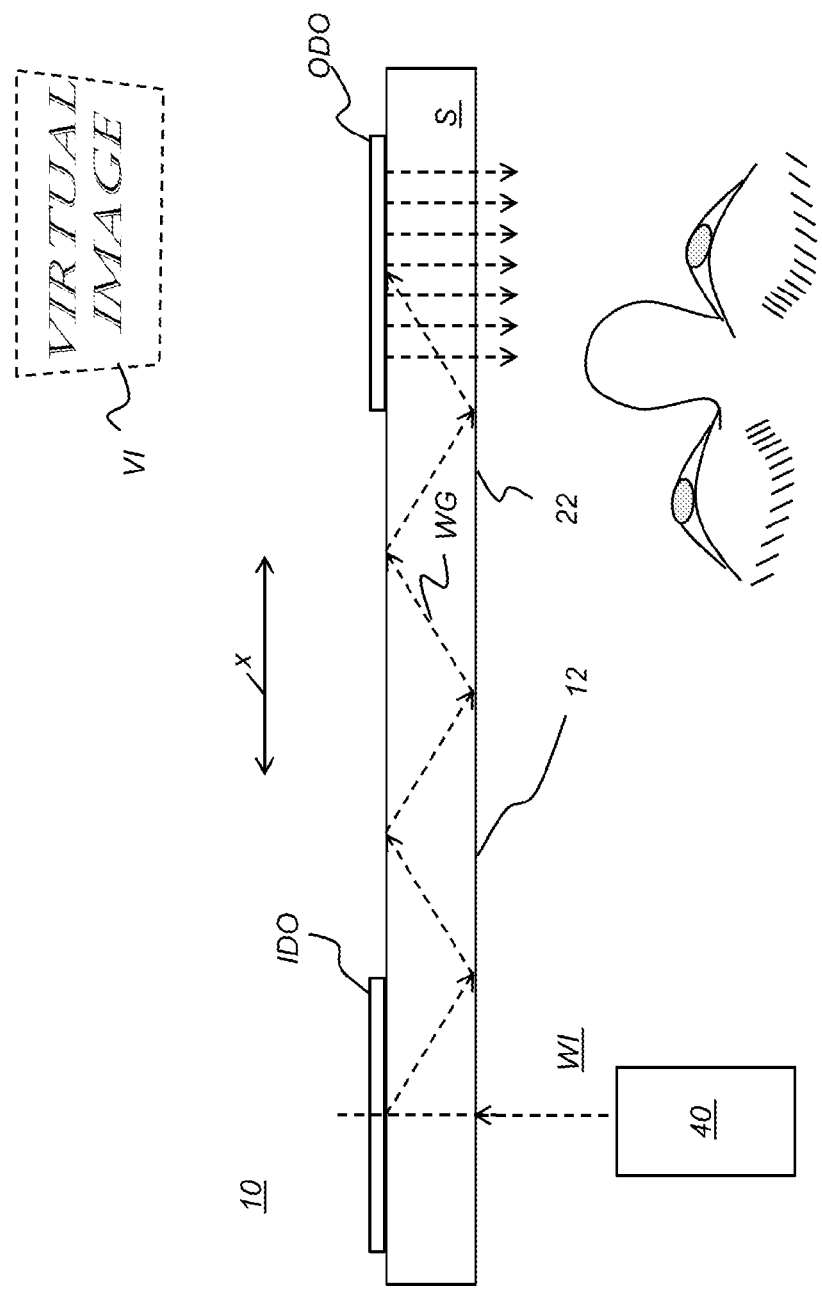
FIG. 4A is a top view schematic showing how an imaging light guide forms a virtual image.

In order for an understanding of apparatus and methods of the present disclosure, it is instructive to consider how the displayed virtual image is formed. FIG. 4A shows how imaging light guide 10 forms a virtual image with collimated light beams propagating along the waveguide 22. A projector 40, which can be fitted within a frame or mount 80 that holds imaging light guide 10 as shown subsequently, directs image-bearing light beams into the waveguide 22 through in-coupling diffractive optic IDO. The light is conveyed through waveguide substrate S to out-coupling diffractive optic ODO to form a virtual image that is seen by the eye of the viewer. The virtual image VI appears to be in the field of view, directly ahead of the viewer.

Figure 4B:
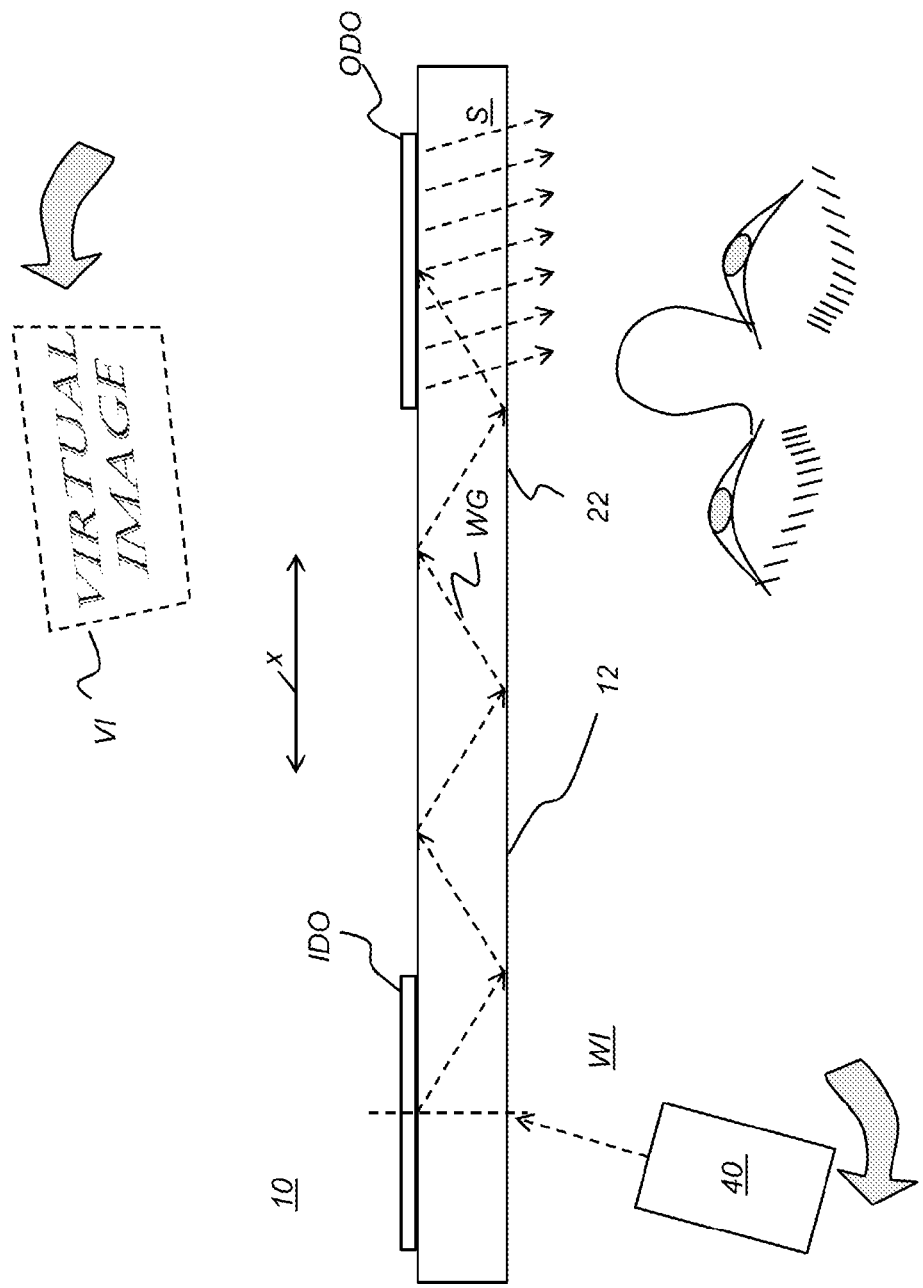
FIG. 4B is a top view schematic that shows how the angle of incidence of the image-bearing light affects the apparent position of the virtual image.
Figure 4C:
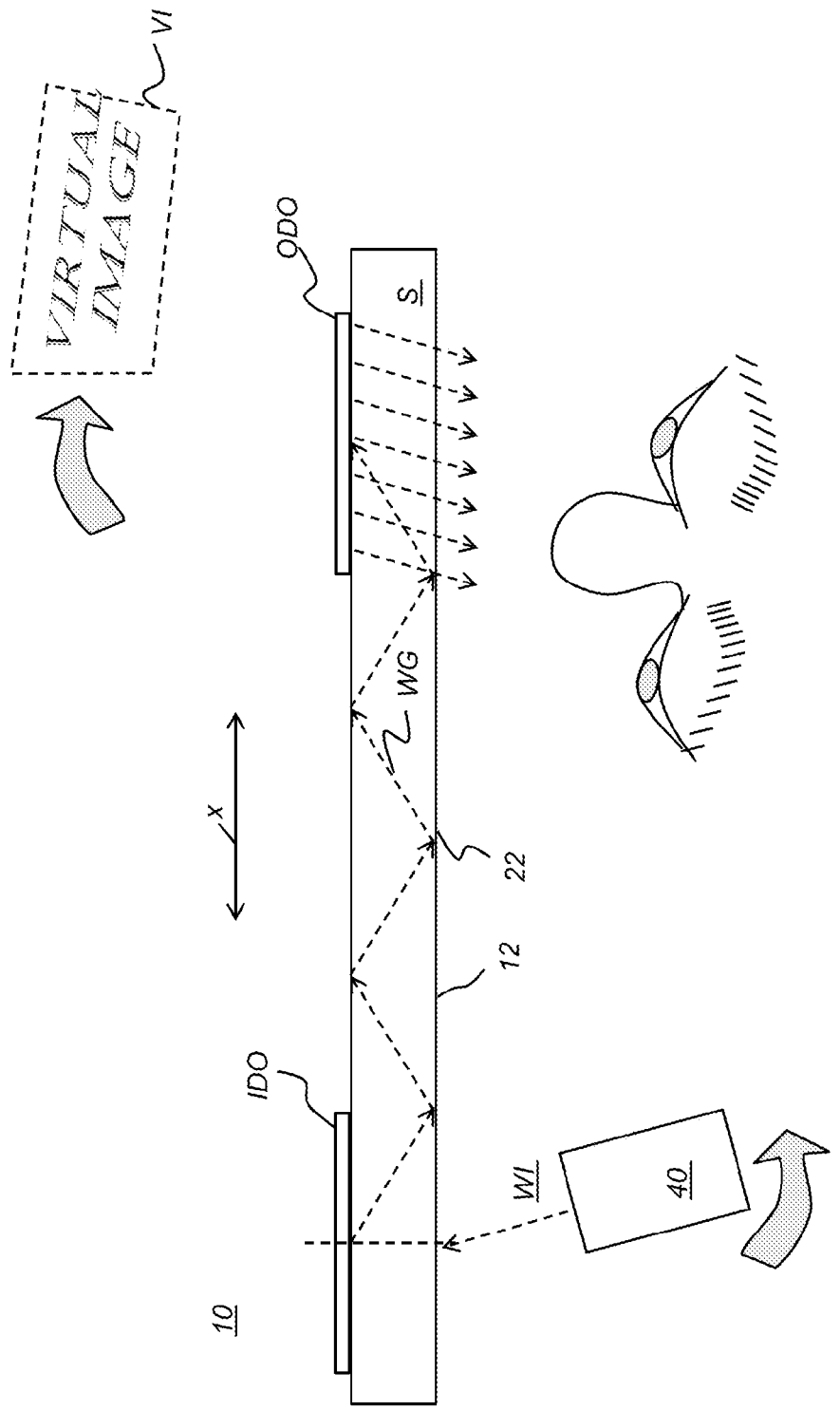
FIG. 4C is a top view schematic that shows the relative shift of virtual image VI with incidence changed in the other direction from that of FIG. 4B.

FIG. 4B shows, from a top view, how the angle of incidence of a central beam among the image bearing beams emitted from the projector 40 and incident upon the waveguide 22 affects the apparent position of the virtual image VI. With an angular shift in the angle of incidence upon the waveguide 22, imaging light guide 10 mirrors the angular change and forms virtual image VI at a shifted position, exaggerated in FIG. 4B for the sake of description. FIG. 4C shows the relative shift of virtual image VI with incidence changed in the other direction. In FIGS. 4B and 4C, the relative change for the angular position of projector 40 is shown.

Figure 5:
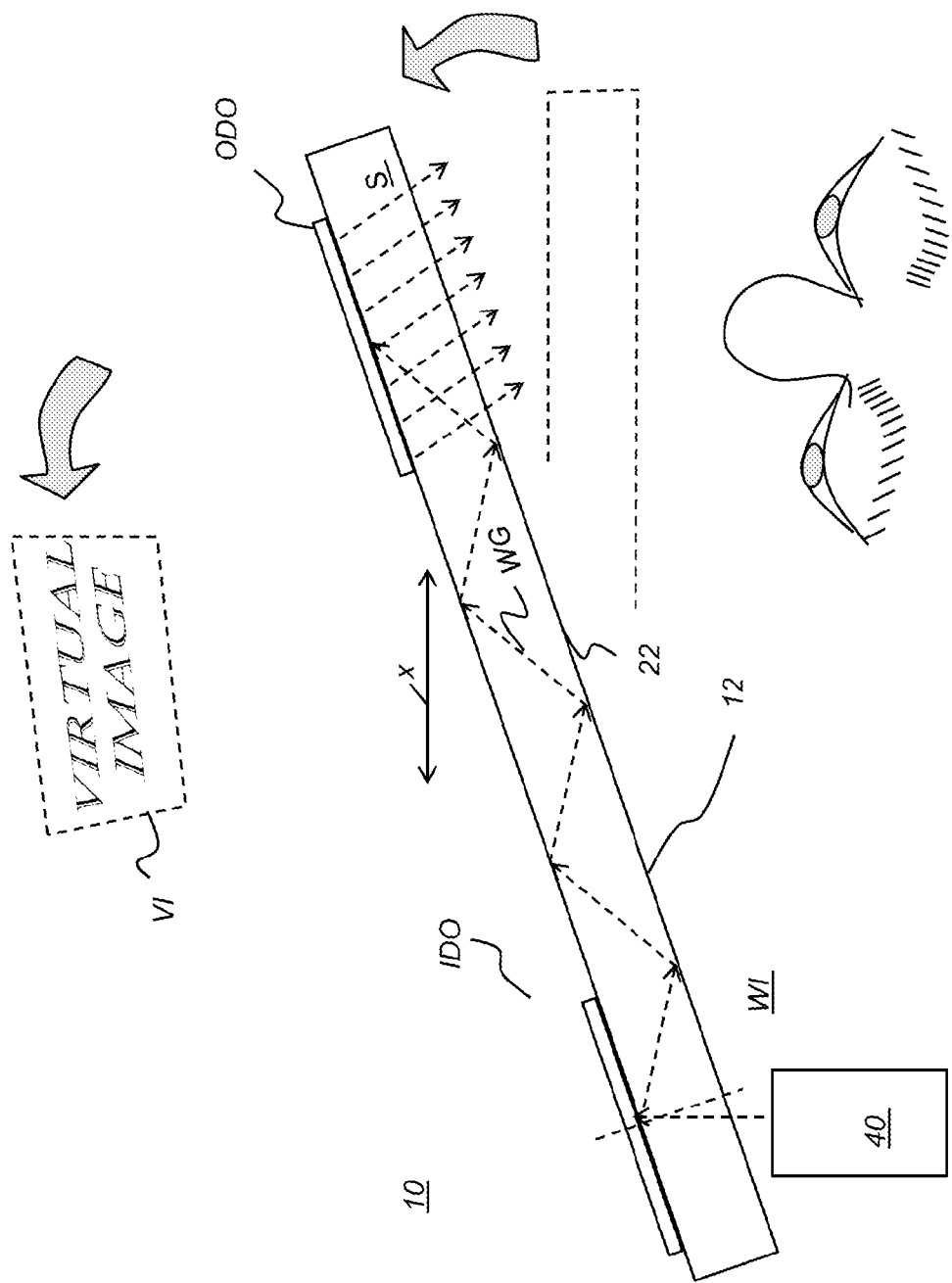
FIG. 5 is a top view schematic showing how the relative shift in virtual image position can be effected with the projector in fixed position and the imaging light guide alternately moved to change the incident angle.

FIG. 5 shows the relative shift in virtual image VI position with projector 40 in fixed position and the waveguide 22 pivoted about a vertical axis to change the incidence angle. Again, the change in relative angle causes a corresponding shift in virtual image VI position.

This mirrored change in virtual image VI position can also be effected in the vertical direction. FIGS. 6A and 6B show side views with the central beam from projector 40 oriented at both normal incidence and oblique incidence to the waveguide 22. With the projector 40 fixed, the waveguide 22 is pivoted about a horizontal axis for relatively tilting the waveguide 22 out of vertical.

An embodiment of the present disclosure allows the rotation of the waveguide 22 using a hinged arrangement, thereby shifting the horizontal position of the generated virtual image.

Figure 7:
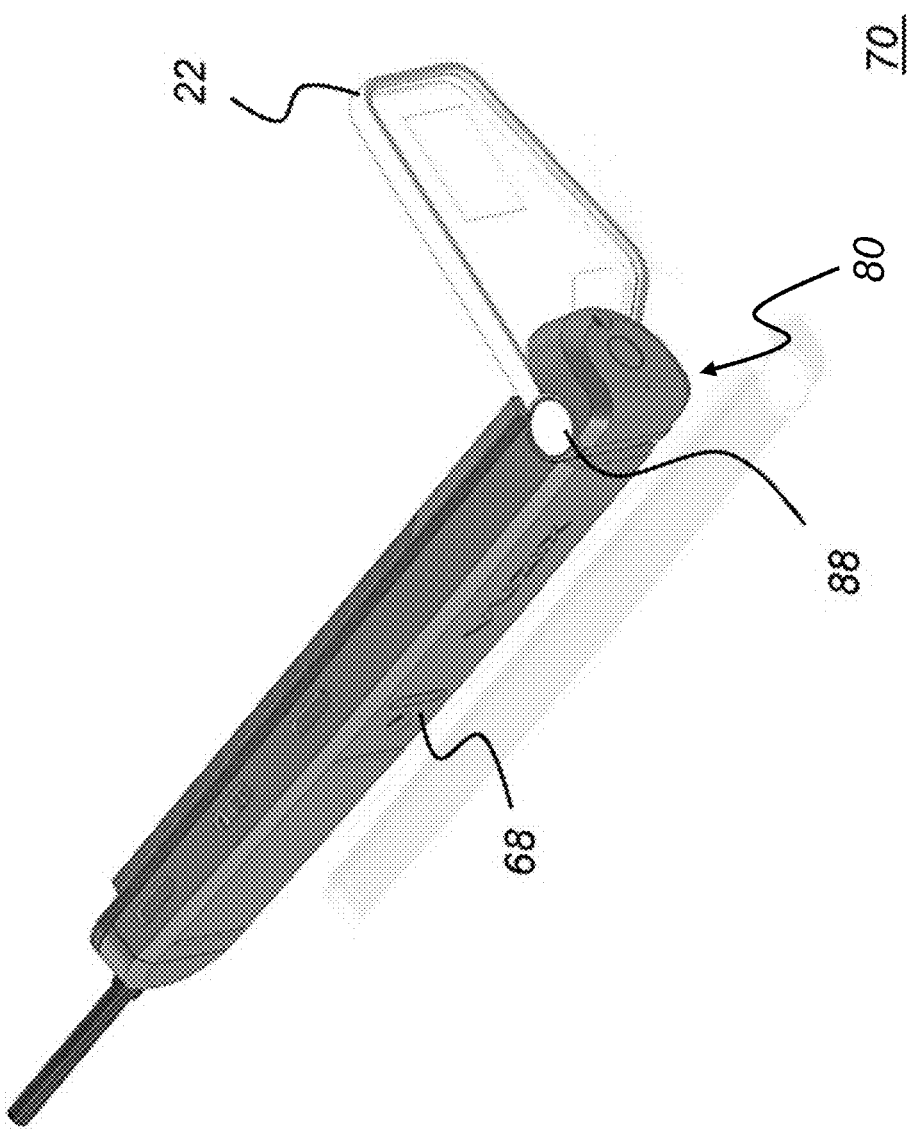
FIG. 7 is a perspective view that shows a portion of an adjustable imaging apparatus that supports the imaging light guide in movable configuration.
Figure 8:
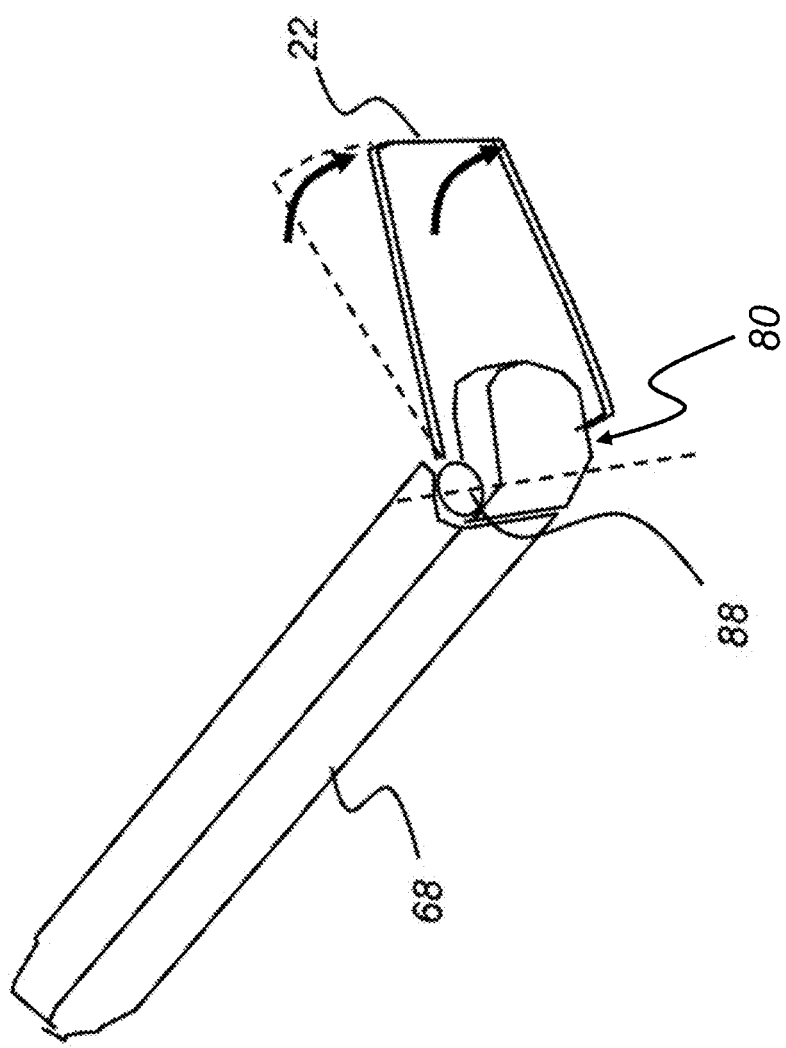
FIG. 8 is a perspective view that shows the waveguide moved to a different angular position.

FIG. 7 shows an adjustable imaging apparatus 70 that supports waveguide 22 in movable configuration. A hinge 88 allows the waveguide 22 to be pivoted about a vertical axis in a horizontal plane, without moving the projector 40 in projector portion 68 of the frame, as shown in FIG. 8. Projector 40 is in fixed position; only the waveguide 22 moves. The view to the virtual image not only moves with the waveguide 22, but the virtual image moves within the waveguide 22 allowing for better positioning of the virtual image in the user's line of sight.

Embodiments described herein use diffractive optics for in-coupling and out-coupling functions and used conventional planar waveguides. It must be noted that input and output coupling can use mechanisms other than diffraction, such as reflection, for example, for directing angularly encoded beams into and out from the waveguide and providing the desired beam expansion. One or both the in-coupling and out-coupling optics can be prisms, for example. The in-coupling or out-coupling optics can be a mirror, or multiple mirrors, within the plane of the waveguide and tilted to the outer surfaces. Mirrors can be partially reflective and can be arranged in parallel to each other.

The invention has been described in detail with particular reference to presently preferred embodiments, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A wearable display apparatus, comprising:
  a frame operable to support the display apparatus against a viewer's head, the frame having a forward section;
  a projector fitted within the frame, the projector operable to generate collimated image-bearing light beams;
  a mount attached to the forward section of the frame; and
  an imaging light guide in a path of the image-bearing light beams, wherein the mount supports the imaging light guide in front of the viewer;
  wherein the imaging light guide comprises:
    a waveguide having a substrate formed from a transparent optical material;
    an in-coupling optic disposed to direct at least a portion of the image-bearing light beams into the waveguide; and
    an out-coupling optic disposed to expand at least a portion of the image-bearing light beams in a lateral dimension and to form a virtual image within a viewer eyebox, wherein the virtual image appears at a distance in a field of view of the viewer;
  wherein the mount includes a hinge operable to provide angular adjustment of the waveguide with respect to the projector; and
  wherein the mount is operable to adjust a position of the waveguide in at least one of a horizontal plane and a vertical plane, thereby repositioning the virtual image within a line of sight of the viewer without repositioning the projector and without changing the distance at which the virtual image appears in the field of view of the viewer.

2. The apparatus of claim 1, wherein the hinge has a vertical axis operable to provide angular adjustment of the waveguide with respect to the projector in a horizontal plane.

3. The apparatus of claim 1, wherein the hinge has a horizontal axis operable to provide angular adjustment of the waveguide with respect to the projector in a vertical plane.

4. The apparatus of claim 1, wherein one or both the in-coupling and out-coupling optics are at least one of a diffractive optic and a prism.

5. The apparatus of claim 1, wherein the in-coupling optic comprises a mirror within the plane of the waveguide, and wherein the mirror is tilted to the outer surfaces of the waveguide.

6. The apparatus of claim 1, wherein the in-coupling optic comprises multiple at least partially reflective mirrors arranged within the plane of the waveguide, and wherein the multiple at least partially reflective mirrors are tilted to the outer surfaces of the waveguide.

7. The apparatus of claim 1, wherein the out-coupling optic comprises multiple at least partially reflective mirrors arranged within the plane of the waveguide, and wherein the multiple at least partially reflective mirrors are tilted to the outer surfaces of the waveguide.

8. The apparatus of claim 1, wherein the imaging light guide comprises an intermediate turning optic operable to direct a diffracted light output of the in-coupling optic to the out-coupling optic;
wherein the intermediate turning optic is operable to account for a difference in angle between grating vectors of the in-coupling optic and the out-coupling optic;
wherein the in-coupling optic comprises periodic rulings; and
wherein the intermediate turning optic comprises a plurality of diffraction elements having an angular orientation and a spacing geometry that are a function of the periodic rulings of the in-coupling optic.

9. The apparatus of claim 8, wherein the intermediate turning optic is operable to produce pupil expansion via multiple diffractive encounters with the diffracted light output of the in-coupling optic along a first direction of propagation.

10. The apparatus of claim 8, wherein the out-coupling optic is operable to produce orthogonal pupil expansion via multiple diffractive encounters with a diffracted light output of the intermediate turning optic along a second direction of propagation, the first direction of propagation being orthogonal to the second direction of propagation.

11. The apparatus of claim 8, wherein a pitch of the intermediate turning optic matches a pitch of the in-coupling optic and a pitch of the out-coupling optic.

12. The apparatus of claim 8, wherein the diffraction elements of the intermediate turning optic are orientated at substantially 60 degrees to the diffracted light output of the in-coupling optic along a first direction of propagation.

13. A wearable display apparatus, comprising:
a frame operable to support the display apparatus against a viewer's head;
a projector operable to generate collimated image-bearing light beams;
a mount coupled with the frame; and
an imaging light guide coupled with the mount, wherein the imaging light guide is located in a path of the image-bearing light beams, wherein the mount supports the imaging light guide in front of the viewer;
wherein the imaging light guide comprises:
a waveguide having a substrate formed from a transparent optical material;
an in-coupling optic disposed to direct at least a portion of the image-bearing light beams into the waveguide; and
an out-coupling optic disposed to expand at least a portion of the image-bearing light beams in a lateral dimension and to form a virtual image within a viewer eyebox, wherein the virtual image appears at a distance in a field of view of the viewer;
wherein the projector is positioned within the mount;
wherein the mount includes a hinge operable to provide angular adjustment of the waveguide with respect to the projector; and
wherein the mount is operable to adjust a position of the waveguide in at least one of a horizontal plane and a vertical plane, thereby repositioning the virtual image within a line of sight of the viewer without repositioning the projector and without changing the distance at which the virtual image appears in the field of view of the viewer.

14. The apparatus of claim 13, wherein the hinge comprises a vertical axis operable to provide angular adjustment of the waveguide with respect to the projector in the horizontal plane.

15. The apparatus of claim 13, wherein the hinge comprises a horizontal axis operable to provide angular adjustment of the waveguide with respect to the projector in the vertical plane.

16. The apparatus of claim 13, wherein the in-coupling optic comprises one of a diffractive optic and a prism, and wherein the out-coupling optic comprises one of a diffractive optic and a prism.

17. The apparatus of claim 13, wherein the in-coupling optic comprises a mirror within the plane of the waveguide, and wherein the mirror is tilted to the outer surfaces of the waveguide.

18. The apparatus of claim 13, wherein the in-coupling optic comprises multiple at least partially reflective mirrors arranged within the plane of the waveguide, and wherein the multiple at least partially reflective mirrors are tilted to the outer surfaces of the waveguide.

* * * * *